indicates the receiving time. The unique word detector 17 has a plurality of output lines D1 to D2$n$+1 each of which is connected to an input of a corresponding one of the AND-gates 22 to 26.

The timing circuit 18 comprises a 2$n$+1 bit shift register which functions to produce the output signal which appears sequentially in stages P$n$ . . . P1, Z, M1 . . . M$n$ when the unique word is shifted $\pm n$ bits relative to the predicted time, that is, when there is a receiving tolerance of $\pm n$ in the predicted receiving time. Each of the stages of the timing circuit 18 has an output line which is connected to another input of a corresponding one of the AND-gates 22 to 26. The timing circuit 18 is initiated in operation by the signal produced by the receiving time circuit 15 which determines the instant that the output signal of the unique word detector 17 is provided.

The Z-stage of the timing circuit 18 represents the predicted time. The stage P1 of the timing circuit 18 indicates that the received time is 1 to $n$ bits earlier than predicted. The stage M1 of the timing circuit 18 indicates that the received time is 1 to $n$ bits later than the predicted time. The earlier bits may be indicated as P$i$ and the later bits may be indicated as M$j$, wherein each of $i$ and $j$ is to $n$. The signals in the output lines D1 to D2$n$+1 of the unique word detector 17 and the signals in the output lines of the stages P1 . . . P$n$, Z, M1 . . . M$n$ of the timing circuit 18 function to switch one of the AND-gates 22 to 26 to its conductive condition thereby providing a bit +1 in the corresponding one of the output lines A$n$ . . . A1, N, S1 . . . SN. The bit +1 changes the condition of the output line UW to 1.

When the signal of the output line UW becomes 1, the two way adder or add-subtract circuit 19 initiates, in order to adjust the predicted receiving time table for the next frame, the buffer register 13 into adding +$i$ in its memory, when an AND-gate corresponding to an output line A$i$ is in its conductive condition. The output signal in the output line UW takes no action when the AND-gate corresponding to the output line N is in its conductive condition. The output signal in the output line UW causes the add-subtract circuit 19 to initiate the buffer register 13 to add −$j$ when the AND gate corresponding to an output line S$j$ is in its conductive condition. The adjusted values are thus stored as the next predicted receiving time table EPH and replace the present predicted receiving time table. Upon completion of the process the receiving time circuit 15 advances the address instruction circuit 21 one step and reads out the next information relating to the incoming burst B$i$+1 from the table memory 11. Since the cycles are continuous, each frame is corrected for the deviation to the proper predicted receiving time of each burst to utilize the information for the following frame. This results in proper constant tracking of receiving times, regardless of received fluctuating bursts.

In addition to the modification of the frame, the control unit 20 functions to provide proper modification of the timing by checking the output signals of the unique word detector 17. If the output signal from the receiving time circuit 15 indicates to the control unit 20 that the output from the unique word detector 17 has been actuated via said receiving time circuit, this indicates that the bursts are synchronized within the receiving tolerance. If the output signal from the unique word detector 17 has not been actuated via the receiving time circuit 15, it indicates that the bursts have not been properly synchronized. In the case of actuation via the receiving time circuit 15, the control unit 20 clears the receiving failure ERC part of the table memory 11. In the case of nonactuation via the receiving time circuit 15, the number of the failure is stored by recording the number and adding 1 to the receiving failure ERC part of the table memory 11 each time a failure occurs.

When a number greater than a specific value is counted, the control unit 20 shifts the system to the synchronization mode in order to properly synchronize the bursts, and 00 is written in the synchronized memory condition SYNC part of the memory table 11 to indicate such information. When the bursts are easily synchronized, the synchronized memory condition SYNC part of the memory table 11 writes the information as 10. This process is applicable only when the memory activity ATC part of the table memory 11 stores a 1 which indicates that the concerned burst was involved in the reception of the information. When the memory activity ATC part of the table memory 11 stores a 0, indicating that the burst was not involved in the reception of the information, the control unit 20 causes the receiving time circuit 15 to read out the information concerning the following burst via the address instruction circuit 21. The aforedescribed process is then completed.

FIG. 4 illustrates the unique word register 16 and the unique detector 17. The circuit of FIG. 4 assists in explaining the determination of the time when the receiving of the unique word part of the burst is completed and the transmission of the corresponding output signal in the output line D1 to D2$n$+1. The memory UWR of the unique word register 16 stores the unique word pattern of 20 bits which was previously stored in the table memory 11 (FIG. 3). The stages 161 to 165 of the unique word register 16 comprise 2$n$+1 bits and the pattern stored in said unique word register is shifted. The shifting of the pattern in the unique word register 16 is actuated by the signal UDS provided by the receiving time circuit 15 (FIG. 3).

The unique word detector 17 comprises a plurality of OR-gates 171 to 175. There are 2$n$+1 OR-gates 171 to 175. The OR-gates 171 to 175 correspond to the stages 161 to 165 of the unique word register 16. The corresponding bits are supplied to one part of the input and the unique word pattern of the received burst is supplied to the other part of the input. A plurality of counters 271 to 275 are connected to the OR-gates 171 to 175. When the counters 271 to 275 overflow, a 1 is provided at the output of the corresponding one of a plurality of flip flops 371 to 375 connected to the counters 271 to 275.

The unique word pattern utilized is that expressed in a binary number of 20 bits and the speed of shifting the unique word register is the same as the speed at which the unique word pattern is transmitted each time that the unique word register is shifted. The actuation provided by the receiving time circuit 15 is therefore provided by the output signal of the coincidence detection circuit 14 (FIG. 3), which signal has been supplied from the predicted receiving time table EPH of the table memory 11. Thus, the head of the burst is received when the head of the pattern of the unique word register is shifted to the middle of the bits of the stages 161 to 165 of the unique word register 16, that is, to the $n$+1$^{th}$ bit position.

Since each bit of the stages 161 to 165 of the unique word register 16 corresponds to each output line D1 to D2$n$+1 of the unique word detector 17, it is possible to determine the time lag by checking how far the unique word pattern is shifted in position when receiving the head of the burst and by transmitting a signal to the output of said detector in correspondence with said shift position. When a burst is received, the head bit is supplied to all of the OR-gates 171 to 175. In each of the OR-gates 171 to 175, another input provided from each corresponding bit in the unique word register 16 is joined with that of the head bit to produce a resultant output of the corresponding OR-gate. The second bit of the burst is processed together with the bits of the register in the same manner as the preceding case, except for those bits of the unique word pattern which have been moved one bit to the right by the shift register. This process is repeated for each of the bits of the burst until the unique word pattern completely passes through the register.

Simultaneously, each logic value 0 thus provided, which value indicates that two inputs to the logic circuit of the unique word detector 17 have the same digit value of 0 to 1, is counted each time the value 0 is supplied to a corresponding one of the counters 271 to 275. Each OR-gate 171 to 175 is connected to a corresponding one of the counters 271 to 275 and provides its corresponding counter with the number of coincidences for each bit of each stage 161 to 165 of the unique word register 16. Each counter counts the number of Aldo Perna
Giorgio DeVarda
INVENTORS.

BY

Karl F. Ross
Attorney

Aldo Perna
Giorgio DeVarda
INVENTORS.

BY

Karl F. Ross
Attorney

Aldo Perna
Giorgio DeVarda
INVENTORS.

BY

Karl F. Ross
Attorney

AUTOMATIC CIRCUIT-TESTING MEANS FOR TIME-SHARING TELECOMMUNICATION SYSTEM

Our present invention relates to a telecommunication system of the time-sharing type in which a common path is used for the concurrent transmission, in interleaved relationship, of message samples relating to different communications between a multiplicity of calling stations and a like number of called stations.

In time allocation telephone systems, for example, voice frequencies of up to several thousand kilocycles may be periodically sampled by pulses having a duration of about 1 microsecond. With the recurrence rate or cadence of these sampling pulses equal to at least twice the highest voice frequency to be utilized, 100 or more messages can be simultaneously exchanged over a common transmission path. To this end it is merely necessary that the lines of a calling and a called station communicating with each other, be they local subscriber lines or long-distance trunk lines, be simultaneously connected to the transmission path during the same phase of a scanning cycle, i.e., during a time slot of, say 100 $\mu$sec. Thus, the common transmission path may be subdivided into about 100 communication channels adapted to be individually allotted, for the duration of a call, to a pair of intercommunicating stations.

A system of this description has been described in commonly owned application Ser. No. 802,486 filed Feb. 26, 1969 by S. Martinelli et al. now U.S. Pat. No. 3,951,016.

In that system, several circulating memories are used for the concurrent storage of up to 100 binary codes or "words" which are periodically reproduced, in cyclic succession, to identify calling and called subscribers and to control the progress of the establishment of communication therebetween. More particularly, there are provided a first address memory to register the code numbers of calling subscribers, a second address memory to register the code numbers of called subscribers, and a third or monitoring memory which is operated in step with the two address memories to indicate the state of a call (e.g., initiation, dialing, ringing, talking, termination) in progress during any phase of a cycle corresponding to a time slot allocated to communication. In the specific system particularly described in the above-identified application, 96 time slots or phases are used for communication; the first four phases of a 100-phase cycle (of 100 $\mu$sec. duration) are set aside for supervisory purposes. In one of these so-called service phases, one of the two address memories (specifically the responder memory carrying the code numbers of the called subscribers) consecutively registers the code numbers of all the subscribers associated with the exchange, such registration persisting for one memory cycle and being used to check whether a previously idle subscriber has initiated a call by closing the corresponding line loop. Upon detecting the flow of loop current, the equipment assigns to such describer an available time slot in the caller memory; the code number of the called subscriber, identified by the caller's dial pulses, is then entered in the corresponding time slot of the responder memory. In an exchange serving up to 1,000 subscribers or other local stations identified by three-digit code numbers, all the local lines may thus be scanned within an interval of 0.1 second.

For further details, reference may also be made to Italian Pat. No. 824,625 corresponding to the above-identified application of Martinelli et al.

The circulating memories mentioned above are the subject matter of commonly owned application Ser. No. 735,606 filed by us jointly with S. Martinelli on June 10, 1968. For details of their construction and of the associated logic circuitry, reference may also be made to the corresponding Italian Pat. No. 810,709.

In another commonly owned application, Ser. No. 881,153 filed Dec. 1, 1969 by A. Perna, there has been disclosed a peripheral part of a telephone exchange of this general type wherein the several subscriber lines served by a common transmission path are divided into several groups, e.g., four groups of 24 subscribers each, for the purpose of excluding a limited number of subscribers from service in the event of a malfunction encountered in the circuits of one or more subscribers. That system, designed to insulate the group including a defective subscriber line until the defect has been remedied, is, however, limited to a testing of the switching circuits (as distinct from the voice circuits) of the subscribers or local lines associated with the exchange.

The general object of our present invention is to provide means for effectively testing both the switching or signaling circuits and the talking or conversation circuits of a multiplicity of such local lines or subscribers, associated with a common exchange, in a rapid yet comprehensive manner without interfering with normal telecommunication.

A related object is to provide means responsive to the ascertainment of any line failure to give an alarm and, if the defect is of a nature impairing the performance of other parts of the system, to exclude the corresponding subscriber group from service.

A more particular object is to provide means for testing, in the aforedescribed manner, the entire line of a telephone subscriber up to its junction with the common transmission path.

These objects are realized, pursuant to our present invention, by the provision of check means at the exchange which are operable during a specific service phase of a sampling period or memory cycle, (sometimes referred to as a frame) for transmitting a test signal over a selected local line to the common path, this transmission involving the use of momentarily closable switch means normally controlled by a central timer for establishing communication during an assigned time slot. The test signal, on reaching the common transmission path, is detected by receiving means connectable during the same service phase (but not necessarily in the same cycle) to the transmission path; one or more indicators, responsive to the output of the receiving means, reveal the operating condition of the selected line whose identity is stored throughout the line test in a register at the exchange.

According to a more specific feature of our invention, the register identifying the line under test is designed as a counter which is stepped under the control of the receiving means for successively selecting lines identified by consecutive code numbers (preferably in an ascending order) upon successful completion of each test.

Advantageously, in a system of the aforedescribed kind including two address memories and a monitoring memory of the circulating type, one of these address memories (e.g., the called subscriber or responder memory) is used to act as the counting register in one of its time slots, i.e., the time slot assigned to the aforementioned service phase. In contradistinction to the scanning time slot described above, in which the code number changes from one cycle to the next and which may be another service slot in the same address memory or in the other address memory, the service slot reserved for the line test retains its code until the test has been completed, i.e., over a succession of cycles.

In such a system, moreover, the corresponding time slot of the monitoring memory may be used as a repository for instructions as to the nature of the test to be performed. For the separate testing of the signaling and conversation circuits of a local line, for example, the line switches serving these circuits may be alternately and concurrently operated during different test stages while a pair of associated receivers are also selectively connected to the signal lead and the conversation lead, respectively, of the transmission path for detecting the performance of each of these circuits. The commands for progressing from one test stage to the next are then issued by the monitoring memory upon the successful completion of a preceding test phase; the first test phase may be initiated by a starting circuit in the input of the monitoring memory, this start circuit ascertaining the idle condition of a line registered in the line-testing time slot of the pertinent address memory in order to prevent such a test from being carried out while the station served by the selected line is engaged in a call. If the line test or any stage thereof is unsatisfactory, the appropriate indicator responds to give an alarm and/or to insulate the affected line; if the defect is of a nature which could detrimentally affect the service over the common transmission path, the affected local station or subscriber may be cut off from that path together with the other stations in a group served by a common branch path.

If the local stations are telephone subscribers whose lines have access to a common ringing circuit through a line switch whose periodic closure in successive cycles enables the transmission of a ringing signal from the central office to a called subscriber, a more specific feature of our invention contemplates the use of this ringing circuit for the transmission of the test signal. This ringing circuit generally bypasses the sensitive electronic switches of the signaling and talking circuits but is coupled to these circuits through a network, including the usual hybrid coil, whereby the ringing signal is transmitted to the talking conductor as well as to a detector of DC switching signals (e.g., dial pulses) generated in the line loop of the subscriber. In accordance with this feature of our invention, we provide switchover means for connecting a source of audiofrequency current to the ringing circuit in lieu of the ringing signal generator normally connected to that circuit whereby, during the line-testing service phase, this alternating current (e.g., of a frequency of 800 Hz.) is picked up by the hybrid coil and retransmitted to the conversation lead of the common transmission path. With a rectifier included in the coupling network of the subscriber station, a pulsing of this alternating current introduces a DC component capable of energizing the signal detector thereof; thus, by the use of an interrupter for this audiofrequency current, both the signaling circuit and the conversation circuit can be tested.

With the employment of the ringing circuit for line-testing purposes as described above, a test should be initiated only when that circuit is otherwise idle, i.e., when no caller requests the transmission of ringing current at that time. It is therefore desirable to include in the logic circuitry of the exchange, which controls the advance of the counting register, an enabling circuit which permits such advance to occur only if none of the calls then registered in the various communication time slots of the several memories is at a stage (as determined by the code entries in the monitoring memory) calling for the transmission of ringing current.

Finally, the system according to our invention also enables the testing of the lines for the presence of objectionable crosstalk between adjoining communication channels (assigned to successive time slots), such crosstalk being the result of insufficiently rapid decay of the line voltage from one time slot to the next. Thus, a receiver connected to the conversation lead during a service slot immediately following the aforementioned line-testing slot will detect such residual energization, if present, and will generate an alarm if the level of the crosstalk exceeds a tolerable limit.

The above and other features of our invention will be described in greater detail hereafter with reference to the accompanying drawing in which.

Figure 1:
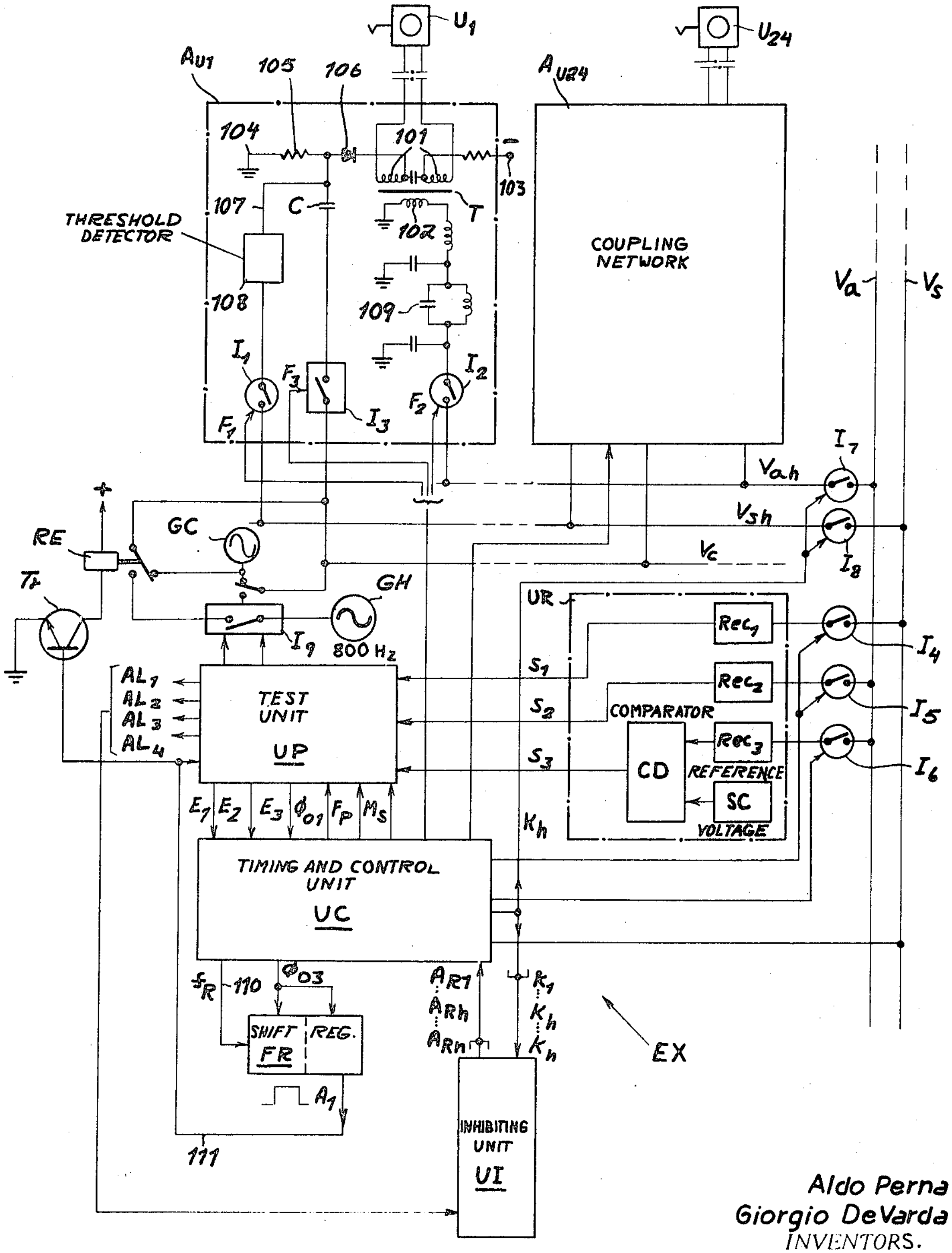
FIG. 1 is an overall circuit diagram of a line-testing system embodying our invention.

In FIG. 1 we have shown a pair of coupling networks $A_{U1}$ and $A_{U24}$ associated with two subscribers $U_1$ and $U_{24}$. Up to 24 such subscribers are linked by a group of such networks with a common transmission path, comprising a conversation lead $V_a$ and a signaling lead $V_s$, via a branch path comprising corresponding leads $V_{ah}$, $V_{sh}$; leads $V_s$ and $V_{sh}$ are representative of several (e.g., two) parallel conductors serving for the transmission of binary code pulses as described in the above-identified copending application by A. Perna. The group of lines serving the networks $A_{U1}A_{U24}$ is one of several such groups, four in the case here considered, connected in parallel to the path $V_a$, $V_s$; the other three groups, being identical with the one shown, have not been illustrated. Subscribers $U_1$ and $U_{24}$, connected to these networks, are representative of a large number of stations (e.g., up to 1,000) served by an exchange EX, it being understood that up to 96 of these subscribers can be temporarily connected to that exchange by way of the grouped coupling networks $A_{U1}$ etc.

The elements of the exchange EX shown in FIG. 1 include a timing and control unit UC, a test unit UP, an evaluation unit UR and an inhibiting unit UI. Details of units UP and UC have been shown in FIG. 2; unit UI has been more fully illustrated in FIG. 3.

In accordance with the teachings of copending application Ser. No. 802,486 (U.S. Pat. No. 3,851,016) and corresponding Italian Pat. No. 824,625, control unit UC periodically emits a variety of timing pulses of 1 $\mu$sec. duration within a 100 $\mu$sec. sampling period or cycle. Of the 100 phases of a cycle established by these pulses, the first four ($0_{00}$, $0_{01}$, $0_{02}$, $0_{03}$) are reserved for supervisory functions, including those specifically described hereinafter, whereas the remaining 96 ($0_{4-99}$) are allotted to communication. One of these service pulses, e.g., pulse $0_{01}$, may also be used for the periodic scanning of all the subscriber lines, as noted above, to determine the open or closed state of their respective line loops.

Unit UC also emits a group signal $K_h$ for the temporary closure of normally open electronic group switches $I_7$ and $I_8$ respectively inserted in branch leads $V_{ah}$ and $V_{sh}$ just ahead of their junction with the main leads $V_a$ and $V_s$. The subscript $h$ is used herein to designate all elements or functions specifically related to the illustrated line group; thus, similar pulses are generated by unit UC for each of the other three groups of the system.

Figure 2:
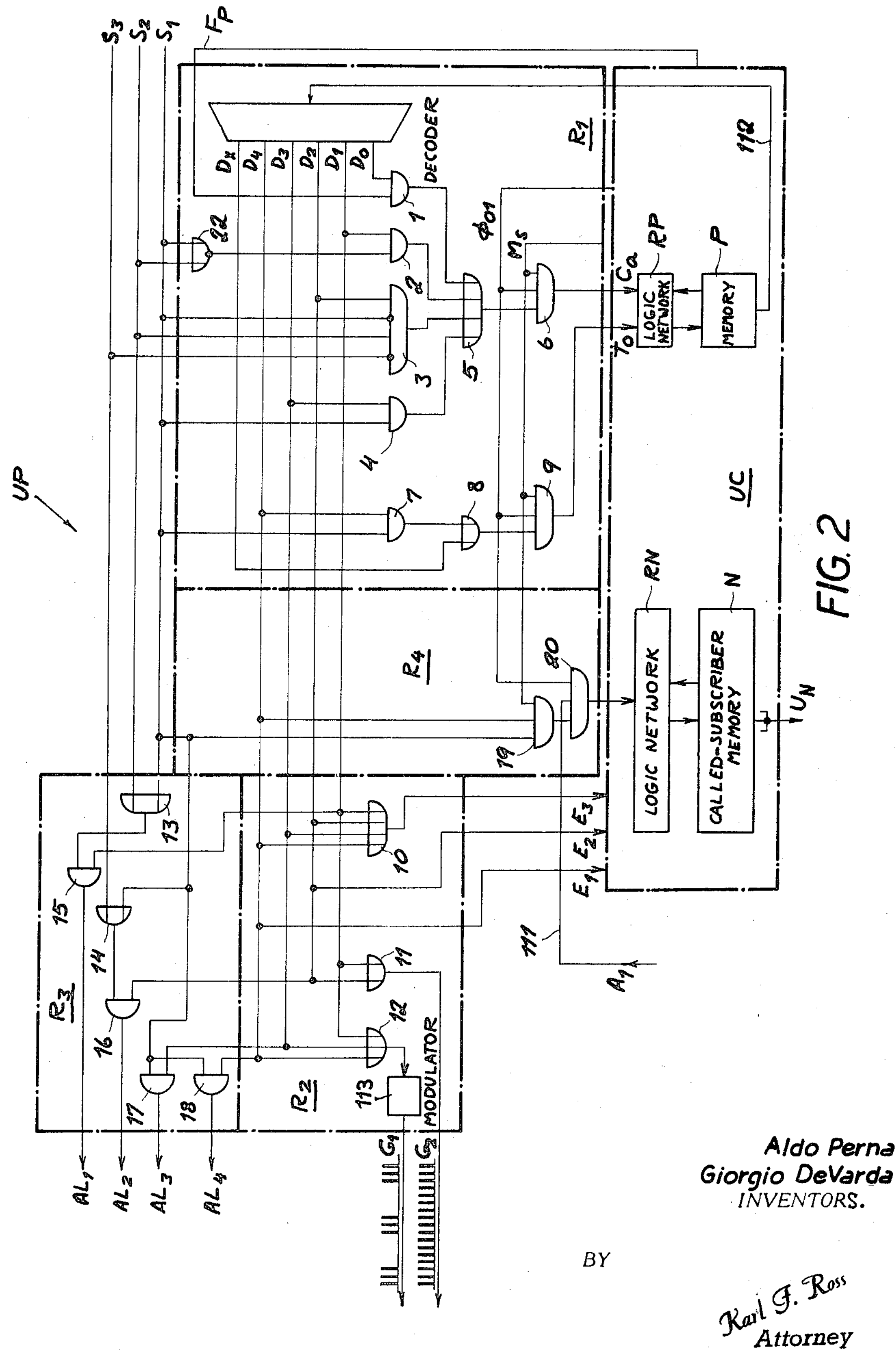
FIG. 2 is a more detailed circuit diagram of some of the components shown in FIG. 1.

In the normal operation of the exchange, pulse $K_h$ is generated during as many (not necessarily consecutive) phases per cycle as there are active local lines in a group, i.e., up to 24 in the embodiment described, to connect the branch path $V_{ah}$, $V_{sh}$ to the common transmission path $V_a$, $V_s$ for the establishment of a corresponding number of communication channels; this takes place under the control of a monitoring memory P, FIG. 2, in a manner not further relevant to the present disclosure. Memory P is of the circulating type referred to above and carries 100 time slots for the storage of as many code words which consecutively appear in its output once per cycle, i.e., with a repetition rate of 10,000 times per second. A similarly constructed address memory N operates in step with memory P, as does another address memory not shown. Memory N serves to register the addresses (in the form of three-digit decimal numbers of called subscribers) whereas its nonillustrated companion memory registers the addresses of calling subscribers. Memories N and P are controlled by respective logic networks RN and RP connected to their inputs.

Each local line, as particularly illustrated for coupling network $A_{U1}$, includes a set of electronic switches $I_1$, $I_2$, $I_3$ which are similar to group switches $I_7$, $I_8$ and are controlled by respective output leads of timing unit UC to close in response to corresponding pulses $F_1$, $F_2$ and $F_3$. In the normal operation of the system, these pulses are generated during the allocated communication phase to condition the associated subscriber $U_1$ for reception of ringing current (switch $I_3$), transmission of voice frequencies (switch $I_2$) and generation of DC signals (switch $I_1$); similar circuitry for the reception of incoming voice frequencies has not been illustrated. The network further includes the usual hybrid coil transformer T whose split winding 101, inductively coupled to another winding 102, is connected in a normally open line loop in series with a direct current source represented by a negative terminal 103 and a grounded positive terminal 104; this connection also includes a resistor 105 and a rectifier 106 in series therewith. A conductor 107 extends from the junction of resistor 105 and diode 106 to a threshold detector 108 which responds to negative potentials generated by closure of the line loop to energize the lead $V_{sh}$ during closure of switch $I_1$. Transformer winding 102, through a low-pass filter 109, energizes lead $V_{ah}$ whenever switch $I_2$ is closed. Closure of switch $I_3$ permits the transmission of ringing current from a generator GC via a condenser C and diode 106 to one-half of the line loop whenever the switch $I_3$ is closed. The connection between ringing current generator GC and switch $I_3$ includes an armature and back contact of a normally unoperated relay RE, this armature being tied to a ringing conductor $V_c$ common to all the networks $A_{U1}$ etc., of the several line groups.

In accordance with our present invention, we provide a test signal generator GH in the form of an oscillator operating in the audiofrequency range, e.g., at 800 Hz. The output lead of this generator, terminating at the front contact of the armature of switchover relay RE, includes an electronic interrupter $I_9$ which can be periodically closed, during a recurrent testing phase as more fully described hereinafter, by either of two control pulses $G_1$, $G_2$ emitted by test unit UP. Pulse $G_1$ is generated during consecutive cycles so that the 800 Hz. test frequency, sampled at 100 $\mu$sec. intervals, appears continuously on lead $V_c$ if the relay RE is operated; pulse $G_2$ is periodically suppressed so as to produce interrupted bursts of this test frequency on lead $V_c$. Since, with closure of switch $I_3$, these bursts are rectified by diode 106 after passing the condenser C, detector 108 picks up one or more DC pulses comparable to the subscribers' dialing pulses. Upon concurrent closure of switch $I_1$, the pulses so detected are communicated to lead $V_{sh}$ and (if switch $I_8$ is also closed) to lead $V_s$. Independently thereof, the test signal is transmitted via transformer T and closed switch $I_2$ to lead $V_{ah}$ and, upon closure of switch $I_7$, to lead $V_a$.

Evaluation unit UR includes three signal receivers $Rec_1$, $Rec_2$, $Rec_3$. Receiver $Rec_1$ is connected to lead $V_s$ through an electronic switch $I_4$ which is closable during a service phase represented by a clock pulse $0_{01}$ from unit UC. Receiver $Rec_2$ is similarly connected to lead $V_a$ through an electronic switch $I_5$ closable by the same timing pulse $0_{01}$. Receiver $Rec_3$ is also connected to lead $V_a$ through an electronic switch $I_6$ which, however, responds to a clock pulse $0_{02}$ in a service phase immediately following the test phase during which switches $I_4$ and $I_5$ are closed. Receivers $Rec_1$ and $Rec_2$, when energized, transmit respective signals $S_1$ and $S_2$ to test unit UP; receiver $Rec_3$ works into a comparator CD which also receives a reference voltage from a source SC and which delivers to unit UP a signal $S_3$ whenever the output voltage of receiver $Rec_3$ exceeds the level of source SC.

Figure 3:
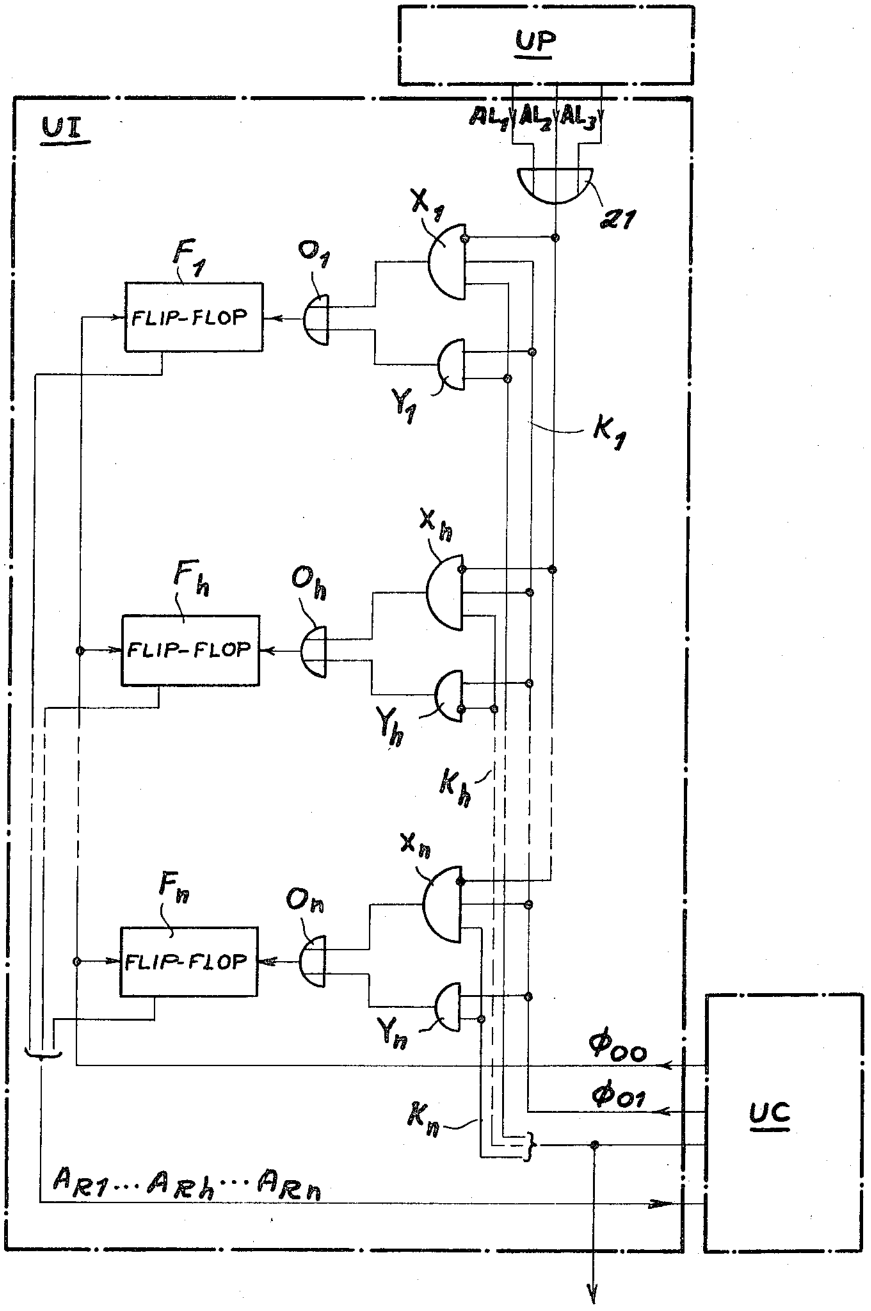
FIG. 3 is a more detailed circuit diagram of a further component.

Test unit UP determines from the presence or absence of signals $S_1$, $S_2$, $S_3$, as likewise more fully described hereinafter, whether the line circuits of the tested subscribers are in order and whether, if they are not, the defect is of a nature requiring the insulation of these circuits from the main transmission path $V_a$, $V_s$ aside from an indication of improper operation. For this purpose the unit UP may generate several alarm signals $AL_1$, $AL_2$, $AL_3$, $AL_4$ which are fed to inhibiting unit UI to cause, if necessary, the emission of a blocking signal $A_{Rh}$ preventing the generation of the group signal $K_h$ by unit UC. Similar blocking signals $A_{R1}$–$A_{Rn}$ can be emitted by unit UI for each of the other line groups, thereby inhibiting the emission of the corresponding group signals $K_1$–$K_n$; these group signals, when generated, are also received by unit UI as shown in FIGS. 1 and 3.

Relay RE is operable by a normally cutoff transistor $Tr$ in response to an enabling pulse $A_1$ which is generated whenever unit UC determines from the contents of memory P that none of the calls inscribed in that memory is at a stage requiring the transmission of ringing current from generator GC to lead $V_c$. This condition is signaled on a lead 110 by a pulse $f_R$ to the first stage of a two-stage shift register FR whose stages are triggered by a clock signal $0_{03}$ serving as a transfer pulse. The output lead 111 of the second stage of the shift register, carrying the enabling pulse $A_1$, also extends to test unit UP as illustrated in FIGS. 1 and 2. Thus, shift register FR acts as a delay network suspending for a full cycle the effect of the appearance or disappearance of signal $f_R$. Relay RE, if of the electromagnetic type, will generally respond with a certain lag to the presence or absence of pulse $A_1$ in the fourth service phase; its finite response time is taken into account by the generation in unit UC of a gating pulse $M_s$ which comes into existence (e.g., under the control of that relay) with a corresponding delay after pulse $f_R$ and, like the latter, persists over a succession of cycles as long as no caller requires the intervention of ringing current generator GC.

A further pulse $F_P$ transmitted from unit UC to unit UP indicates, under the control of responder memory N and the associated caller memory not shown, that the subscriber currently registered in the No. 2 service slot of memory P (assumed to be the station $U_1$, $A_{U1}$) has not been inscribed in a communication slot of either address memory and is therefore not engaged in a call. Pulse $F_P$ also remains in existence for as many cycles as the situation verified by it persists.

Unit UP, receiving from unit UC the pulses $0_{01}$, $F_P$ and $M_s$, in its turn transmits to unit UC a variety of control pulses $E_1$, $E_2$, $E_3$ to generate the switching pulses $F_1$, $F_2$ and $F_3$, respectively.

As shown in FIG. 2, unit UP comprises four separate networks designated $R_1$, $R_2$, $R_3$ and $R_4$. Network $R_1$ includes a decoder *dec* whose input is connected to an output lead 112 of monitoring memory P and which therefore receives from that memory, exactly 100 $\mu$sec. after their inscription and periodically thereafter during consecutive cycles, a variety of command codes registered in the No. 2 time slot (phase $0_{01}$) of that memory under the control of its input network RP. Logic network RP has a number of command inputs (described in greater detail in the above-mentioned application Ser. No. 735,606 and corresponding Italian Pat. No. 810,709) of which only two inputs, i.e., a zero-setting input $T_0$ and a counting or stepping ("add 1") input $C_a$, are relevant to the present invention. Decoder *dec* has several outputs designated $D_0$, $D_1$, $D_2$, $D_3$, $D_4$ and $D_x$. Output signal $D_0$ and enabling pulse $F_P$ are fed into respective inputs of an AND-gate 1. Another AND-gate 2 receives output signal $D_1$ and the output of a NOR-gate 22 supplied with the signals $S_1$ and $S_2$ from receivers $Rec_1$ and $Rec_2$ (FIG. 1). A further AND-gate 3 has two inverting inputs, connected to receive the signals $S_1$ and $S_3$, and two noninverting inputs, connected to receive the signals $S_2$ and $D_2$. An AND-gate 4 receives the signal $D_3$ at a noninverting input and the signal $S_1$ at an inverting input. The outputs of AND-gates 1, 2, 3, 4 are gathered in an OR-gate 5 to feed an AND-gate 6 also receiving the pulses $0_{01}$ and $M_s$, this AND gate working directly into the stepping input $C_a$ of logic network RP. Signals $D_4$ and $S_1$ are delivered to an AND-gate 7 which works into an OR-gate 8 also receiving the signal $D_x$. OR-gate 8 feeds an AND-gate 9 whose other two inputs receive the pulses $0_{01}$ and $M_s$ which works into the zero-setting input $T_0$ of logic matrix RP.

Network $R_2$ of unit UP contains three further OR-gates 10, 11, and 12. OR-gate 10 receives the four command signals $D_1$, $D_2$, $D_3$, $D_4$ from the decoder; OR-gate 11 receives signals $D_1$ and $D_2$; and OR-gate 12 receives signals $D_1$, $D_3$ and $D_4$. The output of OR-gate 10 is the control signal $E_3$ whereas signals $E_1$ and $E_2$ are directly derived from the conductors carrying the signals $D_4$ and $D_2$, respectively. OR-gate 11 generates the continuous pulse train $G_1$ whereas OR-gate 12 actuates a modulator 113 to produce the intermittent pulse train $G_2$.

Network $R_3$ comprises an OR-gate 13 receiving the test signals $S_1$ and $S_2$, as well as an OR-gate 14 receiving the test signals $S_1$ and $S_3$. OR-gate 13 works into an AND-gate 15 to which the decoder signal $D_1$ is also applied; its output is the first alarm signal $AL_1$. OR-gate 14 feeds an AND-gate 16 also receiving the decoder signal $D_2$; its output is the second alarm signal $AL_2$. Another AND-gate 17 receives the signals $S_1$ and $D_3$ to generate an alarm signal $AL_3$. A further AND-gate 13 has an inverting input connected to receive the signal $S_1$ and a noninverting input energized by the signal $D_4$; its output is the alarm signal $AL_4$.

Network $R_4$ has two cascaded AND-gates 19 and 20 for the control of the logic network RN associated with called subscriber memory N. AND-gate 19 has three inputs receiving the pulses $S_1$, $D_4$ and $M_s$. AND-gate 20 receives, in addition to the output of AND-gate 19, the clock pulse $0_{01}$ and the enabling pulse $A_1$; when unblocked, this AND gate causes a stepping of the code number registered in the No. 2 time slot of memory N to identify the next subscriber line to be tested. The call number registered in that time slot periodically issues at $U_N$ from the output of memory N to actuate signaling equipment not shown for informing an operator and/or a supervisory circuit of the identity of a subscriber whose line is found defective.

FIG. 3 shows the components of unit UI designed for the automatic evaluation of alarm signals $AL_1$, $AL_2$, $AL_3$ to disconnect, for the duration of a malfunction, an affected line group from the main transmission channel $V_a$, $V_s$ of FIG. 1. Signals $AL_1$–AL are collected in an OR-gate 21 whose output is fed to inverting inputs of as many AND-gates $X_1$, . . . . . . $X_h$, . . . . . $X_n$ as there are line groups such as those served by the branch channel $V_{ah}$, $V_{sh}$ of FIG. 1. Clock pulse $0_{01}$ is periodically applied to another input of AND-gates $X_1$ etc., and to an input of similar AND-gates $Y_1$, . . . . . . $Y_h$, . . . . . . $Y_n$. A further input of gates $X_1$ etc., and an inverting input of gates $Y_1$ etc., receive the respective group signal $K_1$ etc., issuing from unit UC.

The two AND-gates $X_1$, $Y_1$ etc., of each stage of unit UI work into a common OR-gate $O_1$, . . . . . . $O_h$, . . . . . . $O_n$ whose output sets an associated flip-flop $F_1$, . . . . . . $F_h$, . . . . . . $F_n$ which is reset, at the beginning of each cycle, by a clock pulse $0_{00}$. The reset outputs of these flip-flops are fed to unit UC as the blocking pulses $A_{R1}$, . . . . . . $A_{Rh}$, . . . . . . $A_{Rn}$ for the several line groups inhititing the generation of the corresponding group signals $K_1$ etc., during the communication phases of the same circuit. From the connections described above it will be apparent that such inhibition occurs only if, during the service phase $0_{01}$ at the beginning of the cycle, one of the AND-gates $X_1$ etc., receives an output from OR-gate 21 together with the group signal $K_1$ etc.; in all the other stages the presence of an unrelated group signal unblocks the second AND gate (e.g., $Y_h$) to set the associated flip-flop for the remainder of the cycle, thereby suppressing the blocking signal for that group.

We shall now describe the detailed operation of the system with specific reference to the logic of FIG. 2.

If, in any memory cycle, no code is stored in memory P commanding the transmission of a ringing current to a called station, signal $f_R$ (FIG. 1) is generated and actuates the shift register FR whereupon two cycles later (i.e., after a previous command of this type has been carried out) clock pulse $0_{03}$ generates the enabling pulse $A_1$ received by AND-gate 20. If the last stage of the preceding line test was properly performed, signals $D_4$ and $S_1$ as well as $M_s$ are then present at the inputs of AND-gate 19 as will appear hereinafter; this AND gate therefore conducts during the service phase coinciding with the appearance of a clock pulse $0_{01}$ so that gate 20 is unblocked to actuate the logic network RN with resultant advance of the counting register represented by the corresponding time slot of memory N. We shall assume that the address now registered in this time slot is that of subscriber $U_1$ in the group "*h*" served by the leads $V_{ah}$ and $V_{sh}$. As long as no further stepping of this counting register takes place, that address emerges periodically from memory output $U_N$ in the same time slot to give rise to the associated group signal $K_h$ via coincidence circuits not further illustrated.

The coincidence of pulses $D_4$ and $S_1$ in the inputs of gate 7 also opens the AND-gate 9 upon the appearance of gating pulse $M_s$ a predetermined period after enabling pulse $A_1$. This energizes the input $T_0$ of logic network RP zeroizing the count in the second service time slot of memory P which at last reading was assumed to have reached the numerical value 4. If, for any reason, the preceding test had been halted with a different reading of that memory slot, other than numerical values 1, 2, 3, signal $D_x$ would have appeared in the output of the decoder *dec* and, through OR-gate 8, would have similarly reset the test counter to 0. Signal $D_x$ may be entered in the counting slot of memory P, for example, by manually operable circuits designed to restart the testing after a previous line test had been arrested upon the detection of a malfunction.

The output of monitoring memory P in phase $0_{01}$ now gives rise to signal $D_0$ in the output of decoder *dec* If the address concurrently appearing in the output $U_N$ of memory N does not correspond to any address stored elsewhere in that memory or in the nonillustrated caller memory, as determined by other coincidence circuits not shown, signal $F_p$ is generated to open the gate 1 whereby the following clock pulse $0_{01}$ unblocks the gate 6 to energize the stepping input $C_a$ of network RP so that the test count in memory P is advanced to its next numerical value 1.

When the new count emerges from memory P, decoder *dec* generates the signal $D_1$ with resultant emission of signals $G_1$. $G_2$ from OR-gate 11 and modulator 113. Since the relay RE (FIG. 1) has been energized by enabling pulse $A_1$, the 800 Hz. output of generator GH appears in sampled form on lead $V_c$ and is transmitted to network $A_{U1}$ by the simultaneous closure of switch $I_3$ which results from the concurrent transmission of control pulse $E_3$ from OR-gate 10 to unit UC to produce the switching pulse $F_3$.

It will be noted that neither of the two other control pulses $E_1$, $E_2$ is generated at this time so that switches $I_1$ and $I_2$ remain closed during the testing stage performed by the command $D_1$. This stage is used to determine whether the simulated dial pulses and voice currents now passing the detector 108 and the filter 109 are effectively isolated from leads $V_s$ and $V_a$ by the open state of switches $I_1$ and $I_2$ (switches $I_7$ and $I_8$ are closed at this time by group signal $K_h$) or whether a short circuit produces a voltage on these leads to be picked up by receivers $Rec_1$ and $Rec_2$ whose input switches $I_4$ and $I_5$ are also closed by the clock pulse $0_{01}$. Proper performance of this testing stage, therefore, calls for the absence of both signals $S_1$ and $S_2$; if one of them is present, AND-gate 15 generates the alarm signal $AL_1$.

With both inputs of NOR-gate 22 deenergized, AND-gate 2 conducts to step the test counter of memory P via gates 5 and 6 whereby the count 2 emerges from that memory at the beginning of the next cycle to generate the command $D_2$. This command produces the signals $G_1$ and $E_2$ whereby switch $I_2$ is closed to transmit the simulated voice current to lead $V_a$. During this testing stage, therefore, signal $S_1$ is to be suppressed whereas signal $S_2$ is to come into existence; signal $S_3$, whose presence would indicate objectionable crosstalk between phases $0_{01}$ and $0_{02}$ as explained above, must also be absent. In order that the signal $S_3$ generated during a service phase $0_{02}$ be preserved for the test phase $0_{01}$ of the next cycle, comparator CD (FIG. 1) may include suitable delay means not shown; compensating delay means may also be inserted between the decoder output $D_2$ and the corresponding input of AND-gate 3 to prevent premature stepping of the count in memory P from the second to the third test stage.

If either of the two inputs of OR-gate 14 is energized by signal $S_1$ and/or $S_3$, alarm signal $AL_2$ is generated. If signal $S_2$ is not produced at this time, thus presumably indicating improper closure of switch $I_2$, the test is halted but no alarm signal is sent to unit UI since this defect is not of a nature liable to impair the operation of the other subscriber lines of the same group. With the aid of suitable logic similar to gate 18, for example, the absence of signal $S_2$ in the presence of command $D_2$ may give rise to an alarm indication alerting an operator to the defective condition of the line.

Proper completion of test stage No. 2 opens the gate 3 with resultant advance of the count in memory P to numerical value 3 whereby the command $D_3$ appears in the output of decoder *dec*. Signal $D_3$, which like the other commands $D_1$, $D_2$ and $D_4$ generates the control pulse $E_3$ in the output of OR-gate 10, produces only the intermittent pulse train $G_2$ so that switches $I_1$ and $I_2$ remain closed. Here again, lead $V_2$ is to remain deenergized so that signal $S_1$ must be suppressed; the condition of lead $V_a$ is immaterial for this test stage. The test result is considered positive when, with signal $S_1$ lacking, OR-gate 4 is made conductive by command $D_3$ to advance the test count; otherwise, signal $S_1$ on reaching the AND-gate 17 gives rise to alarm signal $AL_3$.

As the count in memory P advances to its final value 4, the generation of command $D_4$ in the output of decoder *dec* reestablishes the control signal $E_1$ while continuing the generation of pulse train $G_2$. Switch $I_1$ is therefore closed to energize the lead $V_s$ if the line circuits function properly. The absence of signal $S_1$, accordingly, unblocks the gate 18 to produce the alarm signal $AL_4$ which, however, is also of a nature not requiring the intervention of inhibiting unit UI, inasmuch as it merely indicates improper closure of switch $I_1$. If this last test stage is satisfactorily completed, AND-gates 9, 19 and 20 are unblocked to restart the count in memory P and to advance the count in memory N preparatorily to the testing of the next subscriber line as described above.

Signal $M_s$, after coming into existence upon the generation of pulse $A_1$ as described above, may be allowed to persist for a limited period (e.g., of 0.1 to 1 second) whereupon the test is discontinued regardless of its successful or unsuccessful outcome. If the test was negative, the generation of an alarm signal may be utilized to produce the command $D_x$ to restart the test with the same subscriber upon the regeneration of signal $M_s$.

We claim:

1. A telecommunication system comprising an exchange; a multiplicity of local stations with lines terminating at said exchange; a transmission path common to all said lines; timer means establishing a recurrent sampling period; normally open individual switch means for each line controlled by said timer means and momentarily closable during a communication phase of a sampling period for connecting the corresponding line to said transmission path whereby a communication channel is established between two stations concurrently connected to said transmission path during corresponding communications phases of successive sampling periods; check means at said exchange operable during a specific service phase of any sampling period for transmitting a test signal over a selected line via said switch means thereof to said transmission path; receiving means responsive to said test signal connected to said transmission path at said exchange and controlled by said timer means for performing a line test ascertaining the integrity of the selected line; register means at said exchange connected to said receiving means for storing the identity of the selected line during operation of said check means and for thereafter selecting another line for like testing, said register means controlling the operation of said switch means in said service phase; and indicator means controlled by said receiving means for revealing the operating condition of the selected line.

2. A system as defined in claim 1 wherein said register means comprises a counting register steppable under the control of said receiving means for selecting lines identified by consecutive code numbers.

3. A system as defined in claim 2 wherein said exchange includes a circulating address memory with an operating cycle equal to said sampling period, said cycle being divided into time slots assigned to respective service and communication phases of a sampling period, said counting register being constituted by a time slot of said address memory assigned to said specific service phase.

4. A system as defined in claim 3 wherein said exchange further includes a circulating monitoring memory with an operating cycle equal to said sampling period and with time slots synchronized with those of said address memory, said monitoring memory being provided with input means for inscribing different code words in the time slot thereof assigned to said specific service phase, said monitoring memory being further provided with output means for controlling said check means and said switch means to vary the nature of the line test in accordance with the inscribed code word.

5. A system as defined in claim 4 wherein said input means includes a starting circuit for initiating the operation of said check means in a first test stage upon ascertainment of the idle condition of a line registered in the time slot of said address memory assigned to said specific service phase.

6. A system as defined in claim 5 wherein said input means comprises a logic network connected to said output means and to said receiving means for consecutively inscribing said different code words upon successful completion of a test stage commanded by a previously inscribed code word.

7. A system as defined in claim 6 wherein said address memory is provided with logic circuitry connected to said output means and to said receiving means for advancing the count in the time slot assigned to said specific service phase upon successful completion of a final test stage commanded by a code word inscribed in said monitoring register.

8. A system as defined in claim 7 wherein said lines are provided with a common ringing circuit accessible to them through said switch means, said check means being operable to transmit said test signal via said ringing circuit, said logic circuitry including an enabling circuit for the advance of said count upon ascertainment of the idle state of said ringing circuit.

9. A system as defined in claim 1 wherein said transmission path includes a signaling lead and a conversation lead, said lines being provided with a common ringing circuit accessible to them through said switch means, said exchange including a signal generator normally connected to said ringing circuit, said stations including networks effectively coupling said ringing circuit to both said leads by way of said switch means, said check means comprising a source of audiofrequency current and switchover means for temporarily connecting said source to said ringing circuit in lieu of said signal generator.

10. A system as defined in claim 9 wherein said switch means includes a first switch between said network and said signaling lead, a second switch between said network and said conversation lead, and a third switch between said network and said ringing circuit, said first and second switches being jointly and alternately closable by said check means during different stages of a line test, said third switch being so closable in each of said stages, said receiving means including a first and a second receiver respectively connectable by said check means to said signaling lead and to said conversation lead.

11. A system as defined in claim 10 wherein said check means further comprises interrupter means for said audiofrequency current operable to generate DC pulses detectable by said first receiver upon closure of said first switch, said network including rectifier means connected to said ringing circuit.

12. A system as defined in claim 10 wherein said receiving means further includes a third receiver enabled by said timer means in a service phase immediately following said specific service phase and connectable by said check means to said communication lead for verifying the absence of a residual energization thereof after reopening of said second switch.

13. A system as defined in claim 10 wherein said lines are divided into a plurality of groups provided with branch leads respectively connected to said signaling and conversation leads, further comprising periodically closable group switches in said branch leads for insulating each group from said transmission path, said indicator means including inhibiting means controlled by said register means and by said receiving means for preventing closure of a group switch serving the selected line upon unsuccessful performance of certain of said stages of a line test.

14. A system as defined in claim 13 wherein said inhibiting means comprises a plurality of bistable elements individual to each group resettable at the beginning of any sampling period and settable during said specific service phase by an alarm signal from said indicator means.

* * * * *